United States Patent [19]

Liu

[11] Patent Number: 5,151,216

[45] Date of Patent: Sep. 29, 1992

[54] HIGH TEMPERATURE ABLATIVE FOAM

[75] Inventor: Matthew T. Liu, Slidell, La.

[73] Assignee: Martin Marietta Corporation, Bethesda, Md.

[21] Appl. No.: 790,763

[22] Filed: Nov. 12, 1991

[51] Int. Cl.$^5$ .............. B01J 13/00; C08G 18/20; C08G 18/24

[52] U.S. Cl. .............. 252/307; 252/609; 244/117 R; 521/59; 521/110; 428/116; 428/303; 264/52

[58] Field of Search .............. 244/117 RT; 252/609, 252/307; 521/59, 110; 428/303, 116; 424/921; 264/52

[56] References Cited

U.S. PATENT DOCUMENTS

| | | | |
|---|---|---|---|
| 3,384,599 | 4/1968 | Omietanski | 252/352 |
| 3,388,101 | 6/1968 | Wismer | 260/77.5 |
| 3,399,247 | 8/1968 | Windemuth | 260/824 |
| 3,642,646 | 2/1972 | Marcus | 252/182 |
| 3,647,724 | 3/1972 | Doerge | 260/25 AJ |
| 3,916,060 | 10/1975 | Fish et al. | 428/303 |
| 4,077,921 | 3/1977 | Sharpe et al. | 260/25 B |
| 4,133,781 | 1/1979 | Ashida | 521/154 |
| 4,216,136 | 8/1980 | Stayner | 524/405 |
| 4,426,461 | 1/1984 | Smith | 521/116 |
| 4,687,785 | 8/1987 | Parker et al. | 521/106 |
| 4,748,255 | 5/1988 | Parker et al. | 549/243 |
| 4,952,440 | 8/1990 | Sanmartin et al. | 428/116 |

Primary Examiner—Richard D. Lovering
Assistant Examiner—N. Bhat
Attorney, Agent, or Firm—Fields, Lewis, Pittenger & Rost

[57] ABSTRACT

An ablative foam composition is formed of approximately 150 to 250 parts by weight polymeric isocyanate having an isocyanate functionality of 2.6 to 3.2; approximately 15 to 30 parts by weight reactive flame retardant having a hydroxyl number range from 200–260; approximately 10 to 40 parts by weight non-reactive flame retardant; approximately 10 to 40 parts by weight non-hydrolyzable silicone copolymer having a hydroxyl number range from 75–205; and approximately 3 to 16 parts by weight amine initiated polyether resin having an isocyanate functionality greater than or equal to 3.0 and a hydroxyl number range from 400–800.

18 Claims, No Drawings

HIGH TEMPERATURE ABLATIVE FOAM

CONTRACTUAL ORIGIN OF THE INVENTION

The invention described herein was made in the performance of work under NASA Contract No. NAS 8-33708 and is subject to the provisions of §305 of the National Aeronautics and Space Act of 1958 (72 Stat. 435; 42 U.S.C. §2457).

TECHNICAL FIELD

The invention generally relates to the chemistry of carbon compounds and synthetic resins, especially to cellular products or processes of preparing a cellular product, such as foams, pores, channels, and the like, and more specifically to cellular products derived from silicon containing reactants. As a general matter, the invention relates to ablators and to cellular polymers having reduced smoke or gas generation. The invention also generally relates to the chemistry of carbon compounds and synthetic resins, especially to processes of preparing a desired or intentional composition of at least one non-reactant material, i.e., an inert gas which fills the foam pores, and at least one solid polymer or specified intermediate condensation product, or product thereof that forms cell walls, and more specifically to a composition for contact with hot propulsion or exhaust gas or a process for preparing such composition. Further, such composition may be an organic polyisocyanurate or derived from polyisocyanate.

BACKGROUND ART

Ablative materials are employed as part of the thermal protection system (TPS) on space vehicles, such as in the formation of heat shields and insulating coatings. Several ablative foams presently are used in the TPS of the United States space shuttle and, in particular, are used in the TPS of the external tank (ET). Historically, these materials have been selected from or modified from commercially devised foams. Until now, no single foam has been found that meets both engineering and manufacturing constraints for all ET applications, so several different foams must be used.

A major reason that several foams have been necessary is that most foams are designed to meet the requirements of the market's major users, which are the construction and refrigeration industries. Common commercial urethane and isocyanurate foams are intended for use as roof top insulation, piping insulation, refrigerated container insulation, and the like. These commercial uses financially and technically dictate the types of materials being manufactured by the compounders and processors. Thus, the design criteria for most foams are based on pre-established industrial standards. The dominating commercial design factors are cost per pound, insulation value, strength, and flammability in place. In general, commercial foams are classified according to their flammability and smoke generation characteristics, most commonly using the ASTM E-84 test, which compares the material to red oak. In this test, red oak arbitrarily is given a value of 100 both for smoke generation and for flammability. Class 1 foams, which have a 25 rating or less, generally are the only candidates that are screened for usage on the shuttle's external tank. However, without modification even these Class 1 foams have little chance of meeting the engineering criteria for use on the external tank of a space shuttle, since they are designed to be cost-competitive in broad commercial markets.

As a practical matter, the selection of new foams for space shuttle use is further constrained by the established facilities, production methods, and the like that have been designed around the currently used foam's process parameters. For example, when a new foam is selected, it is significantly more efficient and reliable to continue to use the existing facilities and tooling required to apply the currently used foam. Therefore, any backup or replacement foam must be processable within constraints no tighter than those of the current foam if major tooling costs and facilities costs are to be avoided.

The particular needs of the aerospace industry for ablative foams seldom are addressed by the commercial compounders since the quantity of materials used is small. Thus, in the past it has been necessary to start with a commercial foam and work with the compounder to make minor modifications so that the foam meets certain minimum criteria. Such modifications can be quite challenging due to the nature and complexity of the material's chemistry. Thus, in spite of well known specific engineering criteria established for each type of foam used on the external tank, the ET foam needs continue to be filled by modified commercial foams.

The space shuttle and its external tank present specific harsh conditions that must be met by any chosen ablative foam material. Similar requirements are associated with other cryogenically fueled boosters, as well. The harsh conditions which are encountered can be best understood by reference to some of the specific and most difficult mission requirements.

One such requirement is that the foam be strain-compatible with an aluminum substrate at cryogenic temperature. For example, foams that become brittle at minus 423° F. could fail by fracturing or delaminating from the external tank.

Another requirement is that the foam have satisfactory strength at elevated temperature to prevent explosive loss of chunks. Such loss may occur due to internal cell pressure, when the foam is heated to 300° F. from heat sources internal and external to the propellant tanks. Compounding the situation is the near-vacuum external pressure that is encountered during portions of the vehicle's flight.

Additionally, a satisfactory foam must form a dimensionally stable char as a result of thermal decomposition. A part of the foam's thermal protective function is achieved when the surface of the foam forms a char. As long as the char maintains a continuous surface and does not, for example, form wide and deep cracks due to excess char shrinkages, the char achieves the protective function. In addition, the foam must be self-extinguishing in air.

A satisfactory foam must also have low friability. It is generally known that highly three-dimensionally cross-linked isocyanurate foams have been produced in the prior art. These foams may have excellent high temperature properties and yield sturdy chars. However, they are very brittle and damage-prone, and therefore are of little practical value.

At least three different foams presently are used in the TPS for the external tank. The first, a high performance isocyanurate-type spray foam (CPR 488 and NCFI-22-65), is used for major acreage, high-performance applications. This foam is manufactured under highly restrictive processes to assure the material's integrity and performance for flight environments. A second foam (BX-250) is a more generic urethane spray foam, used for ice and frost protection and genera closeouts. This second type is relatively more easily processed and also meets certain design and flight criteria. A third type of foam (PDL-4034) is a pour foam utilized for manufacturing molded parts and general repair of complex areas.

It would be desirable to have a single foam capable of meeting the engineering criteria for all foam uses on the external tank, thus simplifying logistics. Also, by its broad performance range, such single foam likely would provide improved performance in some or all application areas by meeting or exceeding the performance capabilities of the presently used materials.

A number of patents are known to relate to either ablative compositions or to general foam compositions. U.S. Pat. No. 4,077,921 to Sharpe, et al. teaches a sprayable, low density ablative composition employing epoxy-modified polyurethane resins carrying microballoons. This patent is notable because the disclosed composition is for use as an ablator on the solid fuel rockets of the space shuttle. However, the composition itself has little similarity to the present invention.

Other patents disclose isocyanate or isocyanurate foams, which are of the general type produced in the present invention. Polyisocyanurate foams, which are known to have high char resistance and low smoke values by commercial standards, are formed by trimerizing polyisocyanates. The resulting foams, like urethane foams, also have low thermal conductivities. However, commercial versions are known to be brittle and highly friable. These undesirable characteristics have been modified by adding to the isocyanate a urethane polyol, such as a glycol, although the resulting modified foam has less favorable burning and smoke characteristics.

The foams of other known patents are believed to be directed to the major commercial uses, such as construction and refrigeration. For the reasons set out above, these foams are most certainly inadequate for the performance criteria of TPS foams on the external tank of the space shuttle and other cryogenically fueled boosters. However, since in aerospace foams the common commercial criteria are desired, although to a superior degree, these patents are noted for teaching the direction of the art.

One such patent is U.S. Pat. No. 3,647,724 to Doerge, which discloses a polyurethane foam composition with reduced smoke levels, achieved by addition of chlorendic acid. The foam is formed by reaction of an organic polyisocyanate with an active hydrogen-containing material, and a phosphorous fire retardant. The active hydrogen-containing material may be an organic polyol, preferably a polyether polyol having hydroxyl value between 200 and 800. The organic polyisocyanate may be polymeric diphenylmethane-diisocyanate (polymeric MDI), as well as other polymeric polyisocyanates having a functionality greater than 2.0. The fire retardant phosphorus may be contributed by either a reactive or non-reactive compound and supplies from 0.5 to 2.0 percent phosphorus. Optionally, about 0.10 to about 3 weight percent silicon base surfactant may be used in less dense foams and may be omitted entirely in foams weighing 5 to 6 pounds per cubic foot. The foam is formed in conventional manner by use of a blowing agent and a catalyst, such as a tertiary amine or an organic salt of tin. The resulting foam is stated to be self-extinguishing under a commercial ASTM standard.

U.S. Pat. No. 4,426,461 to Smith describes the preparation of a diisocyanurate foam by reaction of a low-functionality methylene diisocyanate with a polyol and a silicone surfactant in the presence of a fluorocarbon blowing agent and a catalyst, such as a quaternary ammonium salt. The resulting product is stated to be suited for use in the construction and insulation field.

U.S. Pat. No. 3,384,599 to Omietanski et al. teaches preparation of an organic polyol modified with organosiloxane groups. The dimers and trimers of isocyanates are identified as suitable reactants with polyol-siloxane compositions. The resulting polyurethane foams are stated to have uniform cell structures.

U.S. Pat. No. 3,399,247 to Windemuth et al. teaches a method of producing polyurethane foam by reaction of a polyether with an organic polyisocyanate and an organosiloxane. The resulting foams are stated to have utility as upholstery, insulation, sponges and the like.

U.S. Pat. No. 3,642,646 to Marcus describes the use of carboxy-bearing adduct polyols, formed by reaction of a polyol and the anhydride of a polyfunctional aromatic carboxylic acid or chlorendic anhydride. The aromatic carboxylic acid anhydride may include tetrachlorophthalic anhydride or tetrabromophthalic anhydride. The adduct polyols are reacted with a polyphenylisocyanate, a fluorocarbon blowing agent, and a catalyst to produce a foam, which the disclosure states will meet commercial standards for fire-resistant foams.

U.S. Pat. No. 4,133,781 to Ashida et al. discloses a polyisocyanurate foam that is stated to have low smoke generation, low friability, high heat-resistance and high flame-retardance, and no bursting property. This result is achieved by adding to the polyisocyanurate foam from 2 to 30 weight percent of an organosilicate having hydroxypolyoxyalkylene groups. As expected, the performance of this foam is measured against ASTM and other common commercial standards.

U.S. Pat. No. 3,388,101 to Wismer et al. discloses the formation of polyurethanes by combination of a polyisocyanate and an organosilane.

Therefore, it would be desirable to develop an ablative foam suited to the needs of the aerospace industry, yet that is suited for use with established facilities, production methods, and tooling.

To achieve the foregoing and other objects and in accordance with the purpose of the present invention, as embodied and broadly described herein, the ablative foam and method of manufacture of this invention may comprise the following.

DISCLOSURE OF INVENTION

Against the described background, it is therefore a general object of the invention to provide an improved class of foam formulations that readily can be customized to the thermal environment of the external tank and other vehicles.

A more specific object is to provide a polyisocyanurate foam that is characterized by strain compatibility with aluminum alloy at cryogenic temperatures.

Another specific object is to provide a polyisocyanurate foam that is characterized by high char yield and high char stability.

A further specific object is to provide a polyisocyanurate foam that is characterized by high flame retardancy.

An important object is to provide a polyisocyanurate foam that is characterized by high foam strength at elevated temperatures due to internal and external heat sources in conjunction with rapid pressure change from one atmospheric down to hard vacuum.

A more detailed object is to provide a rigid, closed cell, thermally stable, urethane-modified isocyanurate foam capable of meeting the specific harsh requirements associated with cryogenically fueled boosters in general and with the external tank of the space shuttle in particular.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, an ablative foam composition is formed of approximately 150 to 250 parts by weight polymeric isocyanate having an isocyanate functionality of 2.6 to 3.2; approximately 15 to 30 parts by weight reactive flame retardant having a hydroxyl number range from 200-260; approximately 10 to 40 parts by weight non-reactive flame retardant; approximately 10 to 40 parts by weight non-hydrolyzable silicone copolymer having a hydroxyl number range from 75-205; and approximately 3 to 16 parts by weight amine initiated polyether resin having an isocyanate functionality greater than or equal to 3.0 and a hydroxyl number range from 400-800; and 5 to 50 parts by weight chloroflurocarbon or hydrochlorofluorocarbon blowing agent, i.e., CFC-11, HCFC 141b, or HCFC-123.

According to another aspect of the invention, the foam is formed of a two component liquid system, wherein the first component contains approximately 85 to 100 weight percent polymeric isocyanate having an isocyanate functionality of 2.6 to 3.2; and a blowing agent. The second component is formed of approximately 15 to 30 parts by weight reactive flame retardant having a hydroxyl number range from 200-260; approximately 10 to 40 parts by weight non-reactive flame retardant; approximately 10 to 40 parts by weight non-hydrolyzable silicone copolymer having a hydroxyl number range from 75-205; approximately 3 to 16 parts by weight amine initiated polyether resin having an isocyanate functionality greater than or equal to 3.0 and a hydroxyl number range from 400-800; and a blowing agent. A catalyst system having at least two elements selected from the group consisting of tertiary amines, alkali metal salt of organotin compounds, and quaternary ammonium salts is in the presence of the second component. The two components are reacted by mixing them in a ratio of approximately from 1.5-2.5 to 1 to form the foam.

One important aspect of the invention is the use of a silicone polymer as a major reactant for polyisocyanurate foam modification, for flexibility at cryogenic temperatures. Another aspect of the invention is the use of halogenated aromatic diol as a secondary reactant to produce a foam with high char yield and especially high char stability. A third aspect of the invention is the use of organic phosphate, incorporated into the foam system to achieve high flame retardancy. Another important aspect is the use of tri-functional, highly reactive, relatively low molecular weight cross-linking agent to increase cross-linking density of the macromolecular network within the foam, thereby creating exceptional foam strength at the upper temperature limit.

BEST MODE FOR CARRYING OUT THE INVENTION

According to the invention, a class of foams has been developed wherein the foams are readily customized to the thermal environments of the external tank of the United States space shuttle and are likewise useful with other vehicles. These are rigid, closed cell, thermally stable, urethane-modified isocyanurate foams produced by reacting a polyol mixture with a polymeric diphenyl methane diisocyanate (polymeric MDI) in the presence of a catalyst system and a fluorocarbon blowing agent.

In particular, a class of high-temperature ablative foams has been formulated using constituents which are selected to enhance performance in the low-temperature and high-temperature environments associated with external tank (ET) insulation. The material system alloys one or more high temperature and high char formation reactive polymers with a highly flexible and reactive inorganic polymer that is relatively temperature insensitive.

The foam is produced from a two part, liquid material system. The first or "A" component may be a polymeric isocyanate, for example polymeric diphenyl methane diisocyanate (MDI) having an isocyanate functionality of 2.6 to 3.2. This polymeric MDI may constitute 100 weight percent of the "A" component. In the presence of a blowing agent such as CFC-11, the polymeric MDI may constitute approximately 90 weight percent of component "A." In other formulations of the foam, such as for spray forming, the "A" component may include additional materials, including fire retardant and silicone surfactant, such that the polymeric MDI is approximately 85 weight percent of this component.

The second or "B" component includes polyol copolymers, flame retardants, crosslinker and catalyst system. It is preferred to employ the combination of both a reactive flame proofing agent and a non-reactive agent. The reactive flame proofing agent should have a hydroxyl number range from 200-260 and weight percent range approximately from 15-30. The non-reactive flame proofing agent should have weight percent range approximately from 10-40. Further, the "B" component includes at least one polyol as a major reactant. This polyol is a reactive inorganic polymer such as a non-hydrolyzable silicone copolymer having hydroxyl number range from 75-205 and weight percent range approximately from 10-40. Typically a mixture of polyols is employed, with the additional polyols including an aromatic diol polymer with halogen substituents on the ring structure. This additional polyol may serve as the reactive flame retardant. In some applications, such as for spray forming, its weight percent may be substantially increased, such as to 35-40 weight percent. The "B" component further includes a cross-linker such as an amine initiated polyether resin having hydroxyl functionality greater than or equal to 3.0, hydroxyl number range from 400-800 and weight percent range approximately from 3-16. The catalyst system in the "B" component has two catalyst components selected from tertiary amines, alkali metal salt organotin compounds, and quaternary ammonium salts. Also, a blowing agent is present in component "B." The reactants are employed in quantities such that the NCO or hydroxyl equivalent ratio is from 3.0 to 5.0 (an isocyanate index of 3.0 to 5.0 range).

The "A" and "B" components are reacted by mixing them. The relative proportions of the two components can be selected and altered according to the type of application, such as pour forming versus spraying. Commonly, the "A" component is the major component, in at least an A:B ratio of approximately from 1.5-2 to 1. However, when spraying these components, the ratio may increase, such as to approximately 2.5 to 1.

Foams made in accordance with this material system formulation have been tested according to ET engineering requirements. Test results are summarized below:

| SUMMARY OF FOAM TESTS - ET ENGINEERING STANDARDS | |
|---|---|
| Density (lb/ft$^3$) | |
| Cup | 2.4 to 2.7 |
| Panel | 2.8 to 3.5 |
| Flatwise Tensile Strength (psi) Room temperature (°F.) | 65-85 |
| Bond Tension Strength (psi) | |
| Room temperature (°F.) | 50-70 |
| +200° F. | 40-50 |
| −320° F. | 40-65 |
| Oxygen index (oxygen % by volume) | 30 |
| Thermal gradient cryoflex (−423° F. ± 10° F., 60 ksi) | No foam debonding or delamination |
| Immersion cryoflex (−423° F., 60 ksi, 100 in. radius) | No foam debonding or delamination |
| Simulated ascent aeroheating environment test. | Good (Better than NCFI-2265) |
| Representative re-entry aeroheating environment test. | Good (Better than NCFI-2265) |
| Processability: Equipment: | Gusmer Foam Machine Model No. FF3 "Little Big Shot" |
| Processing Conditions: | Temperature 104-110° F. Pressure 1100 psi (Component A) 900 psi (Component B) |

All of the constituents are commercially available materials, although some are proprietary to certain manufacturers. In most cases, an equivalent product can be procured from another vendor. In greater detail, these constituents and equivalent selections are as follow.

"A" Component

The polymeric MDI may be E-489 (Mobay), which is a polymeric isocyanate having NCO % of 30.5 and NCO functionality of 2.9. This polymeric isocyanate has the molecular formula

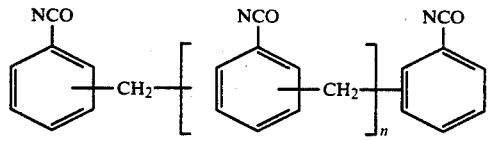

where n=an arbitrary number. It was selected for its high NCO functionality for crosslinking. Equivalent polymeric isocyanates are PAPI 580 (Dow Chemical), Rubinate HF-185 (Rubicon), Suprasec VM90 (ICI) and Mondur MR (Mobay).

"B" Component

One of the polyols is a non-hydrolyzable polymeric silicone (e.g., Union Carbide L5420) that copolymerizes with the isocyanurate structure. The preferred L5420 material is a silicone copolymer of type having the structural formula

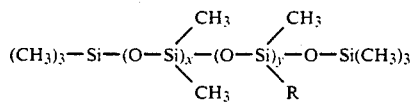

where x,y are arbitrary numbers; R=—(CH$_2$xCH$_2$xCH$_2$)(CH$_2$xCH$_2$O)$_n$(C$_3$H$_6$O)$_m$CH$_3$, where m,n are arbitrary numbers; the linkage between siloxane and the polyether block that is R is —Si—C—; the molecules are capped with hydroxyl group; and the molecular weight depends upon the values of x,y,m,n and is approximately 840. In addition, the L5420 has a hydroxyl functionality of 3 and is non-ionic. This material provides the following properties: chemical and mechanical stability at elevated temperatures; formation of a stable char; good flame resistance; flexibility at cryogenic temperatures due to —Si—O— bond; and low friability. This silicone polymer has been used as a surfactant, is useful to stabilize rigid urethane foam and is designed to be added via the resin component. In such known uses, the application is about 0.5 to 2.0 parts by weight per 100 parts by weight of resin, which is notably small usage as compared to the present application. In the high temperature ablative foam, possible alternates for the Union Carbide L5420 silicone include DC193 silicone (Dow Corning) and DC5103 silicone (Dow Corning).

A second polyol and reactive flame retardant that can be used in combination with the polymeric silicone is an aromatic diol polymer such as tetrabromophthalate diol, or PHT 4-diol (Great Lakes Chemical Corp.). This material is known as a reactive organic bromine intermediate used to produce flame retardant rigid urethane foam. Thus, the aromatic diol polymer also is a reactive flame retardant and is especially suited for replacement of chlorinated polyols. Chlorendic diol (Vesilco Chem.) is an alternate choice for the Great Lakes PHT 4-diol. In the high temperature ablative foam, an aromatic diol polymer with halogen substitution on the ring structure, such as chlorendic diol or PHT-4 diol, provides a number of favorable properties. They include good flame resistance due to the halogen substitution; high char yield, which makes the foam ablative in nature; chemical stability at elevated temperature due to the presence of the aromatic ring structure; mechanical strength and low friability due to formation of a long polymer chain; and formation of an especially stable char due to the aromatic structure. These diols have good flame retardancy due to high bromine content and have good flexibility at cryogenic temperature due to presence of an ether linkage in the molecule. Other possible similar polyol selections include Pluragard C-133 (BASF Wyandotte), nadic methyl anhydride (NMA) (Buffalo Color), amino-S-triazine (American Cyanamid), and Fyrol 6 (Stauffer).

With respect to the flame retardants, a combination of a reactive flame retardant and a nonreactive flame retardant is employed. A suitable non-reactive retardant is tris (2-chloropropyl) phosphate (CH$_3$ CH Cl CH$_2$O)$_3$-P=O, which has a P%=9.5%. This material is selected for its flame retardancy and compatibility with other system components. Other preferred non-reactive retardants are tris (B-chloro-isopropyl) phosphate, sold as Fyrol PCF by Stauffer Chemical, or Fyrol DMMP. These nonreactive retardants yield a phosphorous content of approximately 1 molar percent, which provides good flame resistance. Possible substitutes for the non-reactive flame retardant include diethyl N,N bis (2 hydroxyethyl) amino methylphosphate, sold as Fyrol G by Stauffer; Fyrol CEF (Stauffer), TPP (triphenyl phosphate) (Monsanto), phosphorous tribromide (White), FR-2000 (Dow) and FR-2024 (Dow).

The reactive flame retardant could be an additive such as Dow XNS. Alternatively, the aromatic diol polymer mentioned above, such as PHT 4-diol, can serve as the reactive retardant. In addition to contributing to flame resistance, the reactive flame retardant provides good foam strength especially at the interface with the substrate.

The "B" component includes a suitable cross-linking agent. Foam strength at the temperature limit is achieved by increasing the cross-linking density of the macromolecular network of the foam. It is preferred to use a tri-functional reactant that is highly reactive toward polymeric di-isocyanate. In addition, the reactant should be of relatively low molecular weight. The cross-linking agent may be a polyether polyol of diethylene triamine base. NIAX Polyether Polyol LA-700 (Union Carbide Corp.), which has a hydroxyl number of 700 mg/KOH/g, molecular weight of 400, and hydroxyl functionality of 5, is a preferred material. This cross-linking agent has high reactivity because it is a triamine base. Also, it has high cross-linking efficiency because of high hydroxyl functionality, i.e., 5, with relatively low molecular weight An increase in cross-linking of the macromolecular network means an increase in foam strength. Possible substitutes for the LA-700 crosslinker are Quadro, which is a tetra-functional polyol sold by Wyandotte Chemical; 1,2,4 butane triol (BASF Wyandotte); and Isonol C-100, a phenyl-di-isopropanolamine sold by Dow Chemical.

A combination of catalysts including a cross-linking agent (e.g. Union Carbide LA-700) also is used to control the isocyanurate trimerization reaction. The use of the crosslinker promotes dimensional stability, temperature resistance, and char stability, while maintaining adequately low friability. Foam strength at the temperature limit is achieved by increasing cross-linking density of the macromolecular network of the foam by using tri-functional, highly reactive (toward polymeric diisocyanate) and relatively low molecular weight reactant.

The catalyst employed preferably is a mixture of two catalysts selected from a tertiary amine, an alkali metal salt organotin compound and a quaternary ammonium salt. One such catalyst is M&T Catalyst T-45 (M&T Chemicals), which is a potassium salt catalyst, having about 14% potassium content. It catalyzes the trimerization of isocyanates as well as the polyol-isocyanate reaction for the production of rigid urethanes, rigid spray foam, urethane-modified polyisocyanurates and polyisocyanurate foams. It also has applications in flame retardancy and smoke reduction in urethane foams. This catalyst was selected for use in the high temperature ablative foam because of its ability to catalyze trimerization reaction of the polymeric isocyanates such as E489. Other similar catalysts are Dabco X554 (Air Products), Polycat 8 (Air Products), Dabco 33LV (Air Products), Dabco 798 (Air Products) and T-12 (M&T). A mixed tertiary amine catalyst is TMR 4, which also is useful for catalyzing the trimerization reaction of polymeric isocyanate.

A standard blowing agent is a low boiling, fluorocarbon solvent, stabilized with styrene monomer. Freon 11C (Dupont) may be used.

The material system as described per formulation is suited for pour-in-place or molding foam. This foam system is characterized by unique properties including having excellent char formation and char stability, cryogenic flexibility at $-423°$ F., and flame retardance (limiting oxygen index=29 to 30). However, this material system can be converted into a fast reacting, sprayable foam system by increasing catalyst concentration, changing catalyst system or both. Common catalysts used for trimerization reaction are 2,4,6 tris (dimethylaminomethyl) phenol; dimethylaminomethyl phenol; N,N',N" tris (dimethylamino propyl) sym. hexahydrotriazine/diglycidy ether of bisphenol A; benzyl trimethylammonium hydroxide in dimethyl sulfoxide; benzyl trimethylammonium methoxide; sodium methoxide in dimethyl formamide; alkali metal carboxylates such as potassium acetate; epoxides, such as vinyl cyclohexane dioxide; N-hydroxyl-alkyl quaternary ammonium carboxylates; and N-substituted aziridine. Common catalysts used for urethane reaction are triethylene diamine; N-alkyl morpholines; N, N, N',N' tetramethyl ethylene diamine; N, N, N',N' tetramethyl -1, 3 butanediamino; N, N' substituted piperazines; dialkyl akanolamines; N, N diethyl cyclohexylamine; N, N, N',N' tetramethyl methane diamine; dimethyl ethanolamine; diethyl ethanolamine; methyl diethanolamine; stannous octoate; stannous oleate; dimethyltin dilaurate; dibutyltin dilaurate; dibutyltin di-2-ethyl hexoate; sodium octoate; sodium acetate; potassium acetate; calcium octoate; tetrabutyl titanate; and stannous salt of fatty acids with more than 18 C-atoms. Phosphorous containing flame retardants include phosphate esters; tricresyl phosphate; halogenated organic poly phosphate; chlorinated di and poly phenyls; tris (B-chloroethyl) phosphate; phosphonate esters; and tris (2,3 dibromopropyl) phosphate.

Depending on the shape and size of the component to be protected, foam application can be by one of several techniques: a) spraying; b) pourfoaming using a free foam technique; c) pourfoaming using a restricted cavity technique; or d) RIM (reaction injection molding). Foam reactivity must be matched to the application technique. Spraying requires a high reactivity since the foam must harden as soon as it has expanded so as to prevent slumping. Pourfoaming, on the other hand, requires a low reactivity since time is required to mix the foam components in a container and distribute the mix over the area to be foamed before the foaming action commences. RIM molding is an automated process and requires an intermediate reactivity. Foam reactivity can be controlled by the type and quantity of catalysts used and by the temperature of the liquid foam components.

Foam properties are also dependent on foam density (i.e. foam porosity). For areas requiring cryogenic insulation but where ascent heating is low, lightweight foams of 2.0 to 2.4 lb/ft$^3$ are preferred. Areas subject to higher heating would require foam densities of 3 to 4 lb/ft$^3$. Foam density is governed by the amount of blowing agent, by foam reactivity, and by the processing technique (e.g. free foam or closed mold foam).

Many criteria may be used to evaluate the foams produced. For commercial purposes, rigid spray foams are typically evaluated against industrial design requirements such as the following generic foam design criteria:

1. Processability—good adhesion for a variety of applications;

2. Cost—competitive in market;
3. Low thermal conductivity—highest R rating per inch;
4. Good dimensional stability; and
5. Flammability and smoke generation—meet ASTM E-84 requirements for a specific class.

The engineering criteria for ET foams are significantly different, as follow:
1. Processability—meet engineering requirements within manufacturing constraints, e.g. existing facilities, tooling, etc.;
2. Cryogenic strain compatibility with aluminum substrate—60 ksi at −423° F.;
3. Thermal properties—meet radiant/aero thermal max recession for worst-case design requirements;
4. Mechanical properties—meet RT, +300° F. and −423° F. design requirements;
5. Weight—Low density for major acreage use;
6. Low thermal conductivity—0.19 BTU-in/hr-ft$^2$-°F. at r.t. max.;
7. Non-corrosive—within ET shelf life;
8. Non-flammable—self extinguishing in air—per NHB—8060.1B;
9. Toxicity—no toxic products (with precautions);
10. Shelf life of liquid components—6 months minimum.

EXAMPLE 1

Molding Foam System

A preliminary version of the high temperature ablative foam was established with the following formulation.

|  | Parts by Weight |
|---|---|
| Component "A" |  |
| Papi 580 | 220 |
| Component "B" |  |
| Silicone Surfactant L5420 | 60 |
| PHT 4-diol | 40 |
| Triphenyl phosphate | 36 |
| Dabco 798 | 8 |
| Freon 11C | 5 |
|  | 149 |

The foam having this composition was found to be non-flammable by propane flame testing, to form a stable char, and to be tough.

With the success of the foam system of Example 1, it was possible to modify and evaluate the system and develop initial molding process parameters. The physical properties of derivative ablative foams formed from various of the materials mentioned above have been evaluated in the following tests.

EXAMPLE 2

Foam System Comparisons

|  | Parts by Weight | | | |
|---|---|---|---|---|
| COMPONENT A: |  |  |  |  |
| Papi 580 | 90 | | | |
| Freon 11C | 10 | | | |
|  | 100 | | | |
| COMPONENT B: |  |  |  |  |
| L5420 surfactant | 300.0 | 300.0 | 300.0 | 300.0 |
| PHT 4-diol | 200.0 | — | 200.0 | 60.0 |
| Chlorendic diol | — | 200.0 | — | 140.0 |
| Fyrol PCF | 200.0 | 200.0 | — | 75.0 |
| Fyrol CEF | — | — | 200.0 | — |
| TPP | — | — | — | 125.0 |
| LA-700 | 60.0 | 60.0 | 60.0 | 60.0 |
| T-45 | 6.0 | 4.5 | 4.5 | 4.5 |
| Dabco X554 | 14.0 | 10.5 | 10.5 | 10.5 |
| Freon 11C | 50.0 | 50.5 | 100.0 | 100.0 |
|  | 830.0 | 825.5 | 875.0 | 875.0 |
| FORMULA NO. | 708 | 709 | 710 | 711 |

The physical properties of the foams of this example were evaluated and found to be as follows:

|  | FORMULA NO. | | | |
|---|---|---|---|---|
|  | 708 | 709 | 710 | 711 |
| Density lbs/ft$^3$, panel | 4.2 | 4.2 | 3.2 | 3.4 |
| Flatwise Tensile Strength (psi) at (r.t.) | 69 | 55 | 59 | 51 |
| Bond Tensile Strength (psi) at r.t. | 48 | 42 | 50 | 42 |
| +200° F. | 50 | 46 | 62 | 40 |
| −320° F. | 64 | 80 | 68 | 83 |
| Oxygen index (% volume) | 30 | 30 | 30 | 30 |
| Immersion cryoflex (−423° F., 60 ksi, 100" radius) | No foam debond | No foam debond | No foam debond | No foam debond |
| Thermal gradient cryoflex (−410° F. 60 ksi, 100" radius) | No foam debond | No foam debond | No foam debond | No foam debond |
| W/T test | Pass* | Pass* | Pass* | Pass* |
| Plasma arc test | Pass* | Pass* | Pass* | Pass* |

*Lower recession rate than CPR-488 and NCFI-2265

EXAMPLE 3

Preferred Formulation

Based upon the results of testing in Example 2, the following formulation, derived from formula 708, is preferred for use with the standard mix ratio of A:B=2:1. A high temperature ablative pour foam composition is formed as a two-component system, as follows:

|  | Parts by Weight |
|---|---|
| Component "A" |  |
| E-489 Polymeric MDI (Mobay) | 90.83 |
| Freon 11C | 9.17 |
|  | 100.00 |
| Component "B" |  |
| L5420 Silicone (Union Carbide) | 34.50 |
| PHT 4-Diol (Great Lake) | 23.00 |
| LA-700 Crosslinker (Union Carbide) | 6.90 |
| Fyrol PCF Flame Retardant (Stauffer) | 23.00 |
| T-45 Catalyst (M & T) | 0.46 |
| Dabco X554 Catalyst (Air Products) | 1.14 |
| Freon 11C | 11.00 |
|  | 100.00 |
| Equipment: | Gusmer Foam Machine, Model No. FF3 "Little Big Shot" |
| Conditions: | Components 104° F.–110° F. Temperature: |
|  | Pressure: 1100 psi (Component A) |
|  | 900 psi (Component B) |

Significantly, the level of concentration of the L5420 silicone is shown as 34.5% of the "B" component of Example 3. Typical commercial foams contain from 1 to 3% of this material (or generic alternate) to control cell size formation. The extremely high concentration in the present formulation serves to fulfill a number of specific ET design requirements:
1) Significantly increased char formation and char stability unique to Aft Dome environments.
2) High temperature stability, necessary for upper ogive heating environments.
3) Excellent cryogenic flexibility through the unique combination of trimer-urethane-silicone linkages, a property necessary for high cryostrain $LH_2$ areas.

The composition is formulated for an A:B ratio of two-to-one which is standard for automated mixing or spraying.

Wind tunnel and plasma arc tests show that the ablation performance of the high temperature ablative foams is significantly better than that of other isocyanurate foam systems used on the ET. This is primarily due to the formation of a stable and sturdy char. Also, the flame resistance as determined from Oxygen Index measurements is very high. This makes these foams a potential candidate for use in aircraft interiors and cabins.

EXAMPLE 4

Experimental Formulations

Due to the success of the foam formed in Example 3, formula 708, the following experimental formulations were developed for further evaluation.

| | PART BY WEIGHT | | | |
|---|---|---|---|---|
| COMPONENT "A" | | | | |
| E-489 | 90.83 | | | |
| Freon 11C | 9.17 | | | |
| | 100.00 | | | |
| COMPONENT "B" | | | | |
| L5420 surfactant | 34.50 | 34.50 | 34.50 | 34.50 |
| PHT 4-diol | 23.00 | 23.00 | 11.50 | 11.50 |
| Chlorendic diol | — | — | 11.50 | 11.50 |
| LA-700 | 6.90 | 6.90 | 6.90 | 6.90 |
| Fyrol PCF | 23.00 | — | 23.00 | — |
| Fyrol DMMP | — | 23.00 | — | 23.00 |
| T-45 | 0.46 | 0.46 | 0.46 | 0.46 |
| Dabco X554 | 1.14 | 1.14 | 1.14 | 1.14 |
| Freon 11C | 11.00 | 11.00 | 11.00 | 11.00 |
| | 100.00 | 100.00 | 100.00 | 100.00 |
| FORMULA NO. | EXP 1 | EXP 2 | EXP 3 | EXP 4 |

EXAMPLE 5

Spray Foam

A high temperature ablative foam composition, suited for application by spray, may be formulated by the following foam system:

| | Parts by Weight |
|---|---|
| Component "A" | |
| Polymeric isocyanate E-489 | 420.6 |
| Fyrol PCF | 45.4 |
| Silicone surfactant DC190 (Dow Chemical) | 4.2 |
| Freon 11C | 18.66 |
| | 488.86 |
| Component "B" | |
| Surfactant L5420 | 45.40 |
| PHT-4 diol | 68.06 |
| LA700 | 20.42 |
| T-45 | 8.38 |
| T-12 | 0.06 |
| Polycat 8 | 3.44 |
| Freon 11C | 49.78 |
| | 195.54 |

Mix Ratio: A:B = 2.5:1.0

It may be noted that the nonreactive flame retardant, as well as a small quantity of silicone surfactant, have been added to the "A" component for purposes of spray forming. In addition, the quantity of reactive flame retardant/second polyol is higher than in previous examples, and a third catalyst is added to the catalyst system.

Test results of physical properties for this foam system were as follows:

| Physical Property | | Test Method (ASTM) |
|---|---|---|
| Density (lb/ft$^3$) | 2.6-3.2 | D1622 |
| Bond Tensile (psi) | | D1621 |
| at 300° F. | 35-55 | |
| 200° F. | 35-60 | |
| r.t | 40-65 | |
| −320° F. | 35-55 | |
| −423° F. | 35-45 | |
| Flatwise Tensile (psi) | | D1621 |
| at 300° F. | 40-55 | |
| 200° F. | 50-65 | |
| r.t | 70-90 | |
| −320° F. | 35-60 | |
| −423° F. | 35-55 | |
| Compression (psi) at r.t. | 45-60 | D1621 |
| Flammability (Oxygen Index) | 29-30 | D2863 |
| Wind Tunnel Test at 10 BTU/ft$^2$ - sec. | | Passed (better than NCFI 22-65 foam. |

*The foam currently used.
Useful processing conditions:
(1) Component temperature: 110-140° F.
(2) Substrate temperature: 90-135° F.
(3) Environment: 10-30% relative humidity 90-140° F.

The disclosed class of foam material has the potential to replace every material of the thermal protective system now in localized uses on the external tank of the United States space shuttle, from the acreage, foam to the ablator material used on small areas of high aerodynamic heat. Also replaced would be the material currently used for closeouts, repairs, ramps and the like. This new foam material provides increased performance and reliability plus significant reduction in manufacturing operations and has the potential to be a universal material in the thermal protective system. Additionally, the foam might be used on other cryogenic booster systems and in aircraft interiors and cabins.

Further uses might be in the construction and refrigeration industries, in which this class of foam material far exceeds typical industrial standards. In addition, the foams could be used to insulate hot and cold pipelines, as in the chemical industry or on the Alaska pipeline. In the automotive industry, the foams would provide superior fire wall insulation; and in the transportation industry, improved insulation of refrigerants and cryogenic liquids could be achieved with the foams. Therefore, the scope of the invention includes the use of the foam as an ablative heat shield on many types of structures and components to be protected. The method of application may be any of those previously mentioned, including by way of example spraying, pour foaming on the structure, pour foaming in a closed mold, and reaction injection molding (RIM) in a closed mold.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

I claim:

1. An ablative foam composition, comprising:
   approximately 150 to 250 parts by weight polymeric isocyanate having an isocyanate functionality of 2.6 to 3.2;
   approximately 15 to 30 parts by weight reactive flame retardant having a hydroxyl number range from 200-260;
   approximately 10 to 40 parts by weight non-reactive flame retardant;
   approximately 10 to 40 parts by weight non-hydrolyzable silicone copolymer having a hydroxyl number range from 75-205;
   approximately 3 to 16 parts by weight amine initiated polyether resin having an isocyanate functionality greater than or equal to 3.0 and a hydroxyl number range from 400-800.

2. The ablative foam composition of claim 1, wherein said silicone copolymer having the structural formula

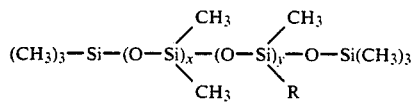

where x,y are arbitrary numbers;
R=—(CH$_2$xCH$_2$xCH$_2$)(CH$_2$xCH$_2$O)$_n$(C$_3$H$_6$O)$_m$CH$_3$
where m,n are arbitrary numbers;
the linkage between siloxane and R is —Si—C—;
the molecules are capped with hydroxyl group; and
the molecular weight depends upon the values of x,y,m,n and is approximately 840.

3. The ablative foam composition of claim 1, wherein said polymeric isocyanate consists essentially of polymeric diphenyl methane di-isocyanate.

4. The ablative foam composition of claim 1, wherein said polymeric isocyanate has NCO % of 30.5 and NCO functionality of 2.9 and the molecular formula

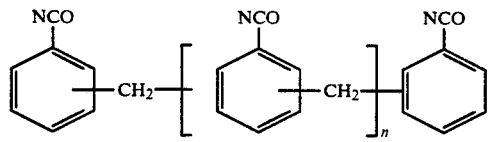

where n=an arbitrary number.

5. The ablative foam composition of claim 1, wherein said reactive flame retardant consists essentially of an aromatic diol polymer with halogen substituents on the ring structure.

6. The ablative foam composition of claim 5, wherein said reactive flame retardant consists essentially of tetrabromophthalate diol.

7. The ablative foam composition of claim 5, wherein said reactive flame retardant consists essentially of chlorendic diol.

8. The ablative foam composition of claim 1, wherein said non-reactive flame retardant is selected from the group consisting of tris (2-chloropropyl) phosphate; tris (B-chloro-isopropyl) phosphate; diethyl N, N bis (2 hydroxyethyl) amino methylphosphate; triphenyl phosphate and phosphorous tribromide.

9. The ablative foam composition of claim 1, wherein said amine initiated polyether resin consists essentially of a polyether polyol of di-ethylene triamine base.

10. The ablative foam composition of claim 9, wherein the polyether polyol has a hydroxyl number of 700 mg/KOH/g, molecular weight of 400 and hydroxyl functionality of 5.

11. The ablative foam composition of claim 1, wherein said foam is formed by mixing said components in the presence of a catalyst system having at least two elements selected from the group consisting of tertiary amines, alkali metal salt of organotin compounds, and quaternary ammonium salts.

12. The ablative foam composition of claim 1, wherein said polymeric isocyanate has NCO % of 30.5 and NCO functionality of 2.9.

13. The method of forming an ablative foam composition suited for high temperature use, comprising:
   formulating a first component comprising approximately 85 to 100 weight percent polymeric isocyanate having an isocyanate functionality of 2.6 to 3.2; and a blowing agent;
   formulating a second component comprising approximately 15 to 30 parts by weight reactive flame retardant having a hydroxyl number range from 200-260; approximately 10 to 40 parts by weight non-reactive flame retardant; approximately 10 to 40 parts by weight non-hydrolyzable silicone copolymer having a hydroxyl number range from 75-205; approximately 3 to 16 parts by weight amine initiated polyether resin having an isocyanate functionality greater than or equal to 3.0 and a hydroxyl number range from 400-800; and a blowing agent;
   placing in the presence of said second component a catalyst system having at least two elements selected from the group consisting of tertiary amines, alkali metal salt of organotin compounds, and quaternary ammonium sats; and
   reacting said first and second components by mixing them in a ratio of approximately from 1.5-2.5 to 1 to form a foam.

14. An ablative heat shield for use in combination with a structure to be protected, wherein said heat shield is formed of an ablative foam composition, comprising:
   approximately 150 to 250 parts by weight polymeric isocyanate having an isocyanate functionality of 2.6 to 3.2;
   approximately 15 to 30 parts by weight reactive flame retardant having a hydroxyl number range from 200-260;
   approximately 10 to 40 parts by weight non-reactive flame retardant;
   approximately 10 to 40 parts by weight non-hydrolyzable silicone copolymer having a hydroxyl number range from 75-205;
   approximately 3 to 16 parts by weight amine initiated polyether resin having an isocyanate functionality greater than or equal to 3.0 and a hydroxyl number range from 400-800;

formed by spraying the foam composition of claim 1 on the structure to be protected.

15. The ablative heat shield of claim 14, wherein said heat shield is formed by the method of spraying said foam composition on the structure to be protected.

16. The ablative heat shield of claim 14, wherein said heat shield is formed by the method of pour foaming said foam composition on the structure to be protected.

17. The ablative heat shield of claim 14, wherein said heat shield is formed by the method of pour foaming said foam composition in a closed mold around the component to be protected.

18. The ablative heat shield of claim 14, wherein said heat shield is formed by the method of reaction injection molding (RIM) said foam composition in a closed mold around the structure to be protected.

* * * * *

UNITED STATES PATENT AND TRADEMARK OFFICE
CERTIFICATE OF CORRECTION

PATENT NO.  : 5,151,216
DATED       : September 29, 1992
INVENTOR(S) : Matthew T. Liu It is certified that error appears in the above-identified patent and that said Letters Patent is hereby corrected as shown below:

Column 16, Line 46, delete "sats" and insert --salts--.

Signed and Sealed this

Eighteenth Day of October, 1994

Attest:

BRUCE LEHMAN

Attesting Officer

Commissioner of Patents and Trademarks